(12) United States Patent
Ormson

(10) Patent No.: US 7,433,709 B2
(45) Date of Patent: Oct. 7, 2008

(54) METHOD OF CALIBRATING CLOCKS FOR TWO INDEPENDENT RADIO ACCESS TECHNOLOGIES WITHOUT THE USE OF ADDITIONAL HARDWARE

(75) Inventor: Richard Ormson, Workingham (GB)

(73) Assignee: Nec Corporation (JP)

( * ) Notice: Subject to any disclaimer, the term of this patent is extended or adjusted under 35 U.S.C. 154(b) by 1222 days.

(21) Appl. No.: 10/412,813

(22) Filed: Apr. 11, 2003

(65) Prior Publication Data

US 2004/0067742 A1    Apr. 8, 2004

(30) Foreign Application Priority Data

Apr. 12, 2002   (GB) .................. 0208493.7

(51) Int. Cl.
  *H04M 1/00*    (2006.01)
  *H04B 1/38*    (2006.01)
(52) U.S. Cl. .................. 455/553.1; 455/574
(58) Field of Classification Search .......... 455/553.1, 455/574
  See application file for complete search history.

(56) References Cited

U.S. PATENT DOCUMENTS 6,766,149 B1 * 7/2004 Hikita et al. ............. 455/83

2003/0043766 A1 * 3/2003 McDonough et al. ....... 370/335

FOREIGN PATENT DOCUMENTS

| GB | 2 320 398 A | 6/1998 |
|---|---|---|
| JP | 2000-188522 | 7/2000 |
| JP | 2000-252968 | 9/2000 |

OTHER PUBLICATIONS

Translation of relevant portions of Japanese Office Action issued on Jul. 16, 2008 in connection with corresponding Japanese Patent Application No. 2003-107275.

* cited by examiner

*Primary Examiner*—Fan Tsang
*Assistant Examiner*—Simon Sing
(74) *Attorney, Agent, or Firm*—Ostrolenk, Faber, Gerb & Soffen, LLP

(57) ABSTRACT

The invention provides for a mobile radio communications device having a first crystal oscillator for providing a first master clock frequency for a timebase of a first communication system, a second crystal oscillator for providing a second master clock frequency for a timebase for a second communication system, a third oscillator for providing a relatively low frequency clock signal within the device, and means for calibrating each of the first and second master clock signals to the third oscillator clock signal, means for determining the ratio of the first and second master clocks on the basis of respective measurements of the first and second master clocks to the relatively low frequency clock signal.

18 Claims, 1 Drawing Sheet

METHOD OF CALIBRATING CLOCKS FOR TWO INDEPENDENT RADIO ACCESS TECHNOLOGIES WITHOUT THE USE OF ADDITIONAL HARDWARE

BACKGROUND OF THE INVENTION

The present invention relates to a mobile radio communications device, and related method of operation and, in particular, to a mobile phone and related method of operation.

Mobile phone comprises a master clock circuit for generating a relatively high frequency clock signal which forms part of the timebase circuitry within the mobile phone. The timebase generated within the mobile phone is intended to be synchronized with a timebase of a base station with which the mobile phone communicates in accordance with a particular communication system such as, for example, the Global System for Mobile Communication (GSM). Such synchronization is usually achieved by use of an automatic frequency control (AFC) mechanism which operates by comparing the frequency of certain signals received from the base station with the frequency of the local clock and then adjusting the local clock to remove the observed frequency difference.

A plurality of mobile communication systems available have been developed which require different master clocks and timebases for their operation.

A mobile phone offering access to two or more such systems would therefore be advantageous since the same mobile phone handset could then be used with a selected one of the different communication systems supported. This choice of system for the same mobile phone would therefore lead to a greater geographical coverage for one and the same mobile phone since different communication systems commonly exhibit different geographical boundaries. This geographical limit commonly occurs at international boundaries and also occurs as a consequence of the time taken to achieve full coverage of a network technology. Such a multi-mode mobile phone would therefore be particularly attractive to users who travel overseas and also to the early users of new technology communications systems.

In order to achieve such interoperability between two or more respective communications systems, a mobile phone will require at least two master clock circuits serving to track the timebases and air interfaces of the respective communication systems. In order to be practically viable, such dual-mode interoperability should allow for ready switching from one communication system to the other and, in particular, allow for the calibrating of the at least two master clock frequencies with respect to each other so as to allow for an accurate and quick transition between the two communication systems.

SUMMARY OF THE INVENTION

The present invention seeks to provide for a mobile radio communications device, and related method, which allows for interoperability between two communication systems requiring different timebases in a simple, reliable and cost effective manner.

According to one aspect of the present invention, there is provided a mobile radio communications device having a first crystal oscillator for providing a first master clock frequency for a timebase of a first communication system, a second crystal oscillator for providing a second master clock frequency for a timebase for a second communication system, a third oscillator for providing a relatively low frequency clock signal within the device, means for calibrating each of the first and second master clock signals to the third oscillator clock signal, and means for determining the ratio of the first and second master clocks on the basis of respective measurements of the first and second master clocks to the relatively low frequency clock signals.

The ready determination of this ratio, and comparison of this ratio to the fixed ratio which would be seen if both clocks were totally accurate, allows for ease of compensation of any drift between the timebases of the respective systems such that the operation of the phone in accordance with the two systems can e quickly and accurately synchronized. For example if the observed ratio is found to differ from the ideal ratio by +1 ppm, then the timebase corresponding to the second clock would need to be retarded by 1 period every 1 million periods. Taking the specific example of the GSM timebase, this would mean a retardation of 1 bit count every 3.69 seconds. Either the first or second timebase can be adjusted in this manner. The correct timebase to amend is the one for the radio access system that is not currently in a logical connection to a cellular network.

In a particular embodiment, the said third clock is provided by the same oscillator as is used in the power saving sleep mode in which at least one of the first and second oscillators is shut down. The invention advantageously employs the sleep mode clock of a low frequency sleep mode arrangement such as that disclosed in UK Patent 2 320 398.

The invention is advantageous in that, through calibration of each of the master clocks against the slower clock it is possible to calibrate the first clock against the second clock without requiring any additional hardware elements. Thus associated additional costs, and the need for additional space within the device can be avoided.

Advantageously, the ratio of the first and second clock signals is determined from the product of the ratio of the first calibration timer to the first sleep timer and the second sleep timer to the second calibration timer.

Advantageously, the protocol stack and hardware required can be adopted unchanged from that employed within single mode mobile devices. Appropriate control of the respective crystals can thus be achieved without requiring any specific multiplexing arrangements. Also, the power consumption can be limited through the shutting-down of elements such as the oscillator, the digital/analogue conversion circuitry and the Application Specific Integrated Circuits (ASICS) which are not required when the handset is communicating by the other of, for example, two communication systems.

Preferably, the two calibration measurements of the first and second clocks to the clock signal of lesser frequency occur substantially simultaneously.

AS will be appreciated, the present invention is particularly advantageous in providing for a multi-mode capability by employing hardware already present as part of the sleep-mode circuitry.

This can prove particularly advantageous in reducing the effect of drift in the clock of least frequency and frequency jitter.

The invention as defined above is particularly advantageous in that it can serve to address the potential problem of drift between the timebases and thereby allow for accurate synchronization and interoperability between the two communication systems.

Yet further, the present invention can allow for the calibration of one master clock against the other even in situations where both clock signals might be subject to problems such as independent frequency control, potential drift and thermal fluctuation.

In one particular embodiment, one communication system comprises the Global System for Mobile Communication (GSM), and the other communication system comprises the Universal Mobile Telecommunication System (UMTS). In this manner, a said first counting means is clocked by the GSM system clock and a second counting means is clocked by a UMTS Terrestrial Radio Access (UTRA) system clock.

According to a further embodiment, the ratio of the first clock signal to the second clock can be obtained through taking the average of a plurality of such ratio measurements.

In this manner the potential problem of phase jitter arriving can effectively be compensated for and overcome.

According to another aspect of the present invention there is provided a method of controlling a time-base within a mobile radio communications device, comprising providing a first master clock signal of first frequency, a second master clock signal of a second frequency, a third clock signal of a lesser frequency, calibrating each of the first and second master clocks to the signal from the third oscillator and determining the ratio of the first master clock to the second master clock on the basis of respective measurement of the first and second master clock signals to the relatively low frequency clock signal.

The invention is described further hereinafter by way of example only, with reference to the accompanying drawing which is a schematic block diagram illustrating a communications device embodying the present invention.

DESCRIPTION OF THE PREFERRED EMBODIMENT

Figure 1:
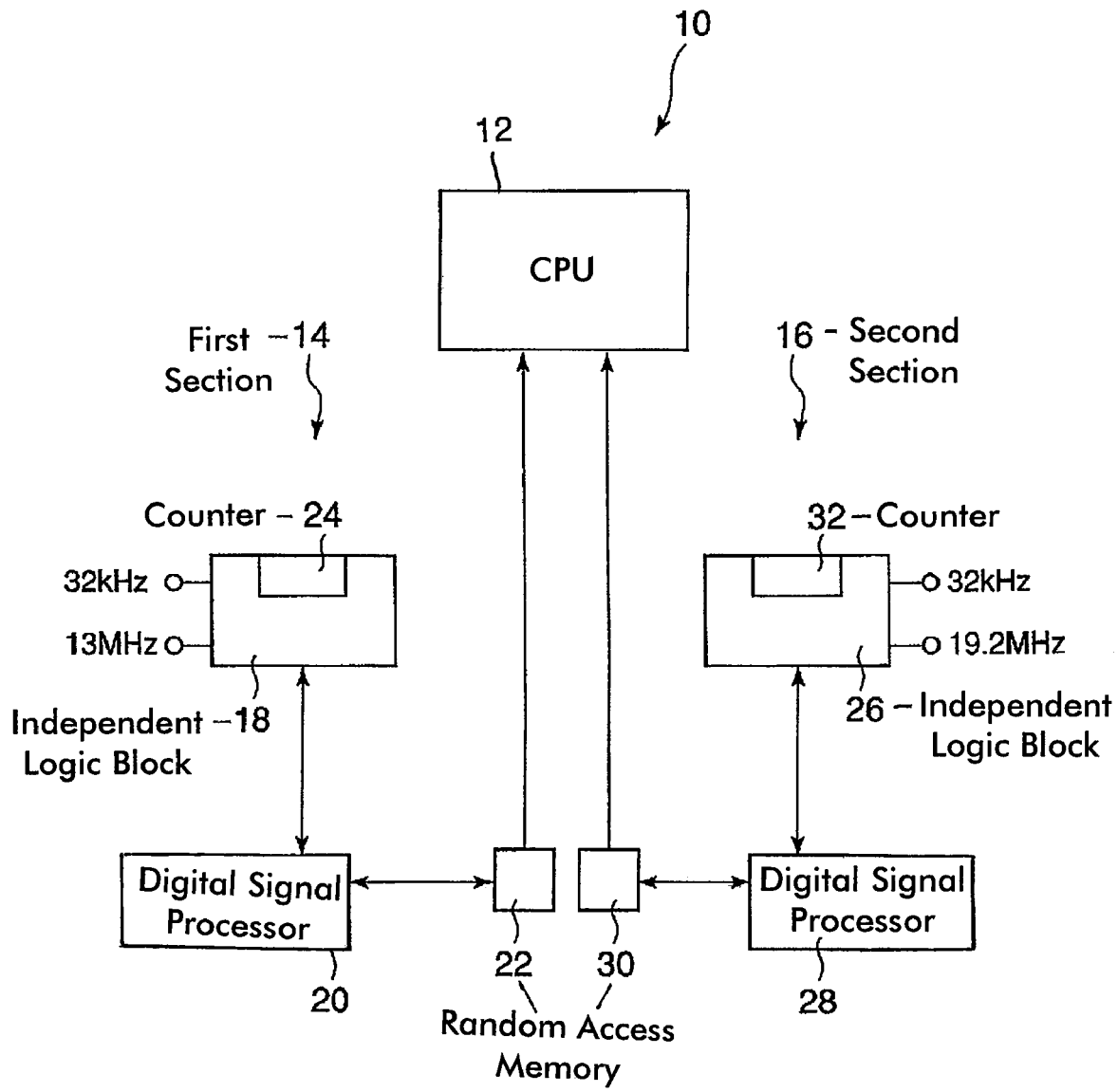
FIG. 1 (a sole FIGURE) shows a schematic representation of a portion 10 of a mobile phone handset circuitry arranged, in accordance with the present invention, for use with two different communication systems.

Referring to FIG. 1, the illustrated circuitry 10 of the handset comprises a first section 14 for operation in accordance with the GSM system, and a second section 16 for use with the UMTS communication system.

As described further below, the illustrated embodiment of the present invention exhibits the so-called 32 kHz sleep concept known, for example, from UK Patent 2320398. In this manner, the circuitry employs a central processor unit 12 connected to various circuit elements providing for a 32 kHz sleep mode for each of the GSM 14 and UMTS 16 sections of the circuitry.

The GSM section 14 comprises an independent logic block 18 arranged for communication with a digital signal processor 20 which, in turn, is arranged for communication with a random access memory 22 arranged to include first and second storage areas (not shown). The random access memory 22 is arranged for communication with the central processor unit 12. The independent logic block 18 also includes a counter 24, which has an output for delivering a count value via the independent logic block 18, the digital signal processor 20 and the random access memory 22 to the central processor unit 12.

The UMTS section of the circuitry generally mirrors the GSM section of the circuitry and so likewise includes an independent logic block 26, digital signal processor 28, random access memory 30 and counting means 32 which is disposed within the independent logic block 26. These elements are connected for operation in a similar manner to the equivalent elements of the GSM portion 14.

In an alternative embodiment however, it should appreciated that a single digital signal processor could be employed by both the GSM and UMTS sections of the circuitry 10. Further, a single logic block could also be employed, Both these developments would move away from the aim of reusing existing handset technology with minimal modification, but would lead to a more efficient design.

As illustrated in the drawing, the independent logic block 18 of the GSM section 14 of the circuitry is arranged to receive a 13 MHz clock signal forming part of the high frequency timebase circuitry for the GSM system, whereas the independent logic block 26 of the UMTS portion 16 of the circuitry is arranged to receive a 19.2 MHz high frequency clock forming part of the UMTS timebase circuitry.

Each of the independent logic blocks 18 and 26 is also arranged to receive the relatively lower frequency sleep-mode clock signal 32 kHz which, when either of the GSM or UMTS sides of the circuitry 10 connected to their respective communications systems, is arranged to provide for the required 32 kHz sleep mode of operation.

Such a mode operation is not described in any great detail here since, as noted above, it is known from, for example UK Patent 2320398. In brief, however, and considering merely the GSM section 14, the means for re-synchronizing with the timebase following completion of the sleep mode makes use of the low frequency 32 kHz clock signal, a first counter, also within the independent logic block, which serves to count the low frequency clock signal, and a second counter 24 for counting cycles of the high frequency timebase clock signal. The first and second storage areas (not shown) within the RAM 22 are arranged to store the count in the second counter at first and second specified points respectively in a timebase cycle. Re-synchronization to the timebase is then achieved on the basis of the counts in the respective memories within the RAM and also with regard to the count obtained by the first counter.

As will be noted from the above, such an arrangement is duplicated within the UMTS side of the device.

As will therefore be appreciated, the re-synchronization to effectively maintain the high frequency timebase during shut down requires calibration of the high frequency clock against the sleep mode clock. To provide for independent sleep modes in UMTS and GSM, calibration of their respective clocks to 32 kHz will be performed. Using this data the ratio of the GSM clock to the UMTs clock can be obtained thus; the product of (the ratio of the calibration count for GSM to the sleep timer for GSM) and (the ratio of the sleep timer for timer for UMTS to the calibration count for UMTS).

As will be appreciated, the sleep timer is a value set by the CPU 12, and the calibration timer is a value that is read back once the sleep mode calibration has been completed.

The invention therefore allows for the calibration of a master clock of one communication system, for example GSM, against a master clock of at least one other system such as UMTS, so as to provide for inter-operability between the at least two systems in spite of the independent frequency control, drift and thermal fluctuation experienced and exhibited by the respective master clocks. This is achieved using hardware that is already present in a standard cellular phone handset.

What is claimed is:

1. A mobile radio communications device comprising:
a first crystal oscillator operable to provide a first master clock frequency for a timebase of a first communication system;
a second crystal oscillator operable to provide a second master clock frequency for a timebase for a second communication system, the second communication system being different from the first communication system;

a third oscillator operable to provide a relatively low frequency clock signal within the device;

a calibrator operable to calibrate signals of the first master clock and the second master clock to a signal of the third oscillator clock; and a determiner circuit operable to determine a ratio of the signal of the first master clock to the signal of the second master clock on the basis of measurements of the signals of the first master clock and the second master clock calibrated to the relatively low frequency clock signal.

2. The device as claimed in claim 1, wherein the said third oscillator is arranged to provide a clock signal for a power saving sleep mode in which at least one of the first crystal oscillator and the second crystal oscillator is shut down.

3. The device as claimed in claim 2, wherein the ratio of the first and second clock signals is determined from the product of:

a ratio of a calibration count to the sleep timer of the first master clock; and a ratio of the sleep timer to a calibration count of the second master clock.

4. The device as claimed in claim 3, and including a controller operable to control a simultaneous occurrence of the calibration measurements of the clock signals of the first and second oscillators to the third oscillator.

5. The device as claimed in claim 4, and arranged to take a plurality of the said calibration measurements and to find an average value therefrom.

6. The device as claimed in claim 3, and arranged to take a plurality of the said calibration measurements and to find an average value therefrom.

7. The device as claimed in claim 2, and including a controller operable to control a simultaneous occurrence of the calibration measurements of the clock signals of the first and second oscillators to the third oscillator.

8. The device as claimed in claim 7, and arranged to take a plurality of the said calibration measurements and to find an average value therefrom.

9. The device as claimed in claim 2, and arranged to take a plurality of the said calibration measurements and to find an average value therefrom.

10. The device as claimed in claim 1, and including a controller operable to control a simultaneous occurrence of the calibration measurements of the clock signals of the first and second oscillators to the third oscillator.

11. The device as claimed in claim 10, and arranged to take a plurality of the said calibration measurements and to find an average value therefrom.

12. The device as claimed in claim 1, and arranged to take a plurality of the calibration measurements and to find an average value therefrom.

13. A method of controlling a time base within a mobile radio communications device having a first master clock signal of a first frequency, a second master clock signal of a second frequency, and a third clock signal of a lower frequency than the first frequency and the second frequency, the method comprising:

calibrating the signals of each of the first and second master clocks to the signal from the third oscillator and determining a ratio of the first master clock signal to the second master clock signal on the basis of measurement of the first and second master clock signals calibrated to the third clock signal.

14. The method as claimed in claim 13, wherein the third clock signal serves to provide for a power saving sleep mode, wherein at least one of the first and second oscillators is shut down.

15. The method as claimed in claim 14, wherein the ratio of the first and second clock signals is determined from the product of:

a ratio of a calibration count to the sleep timer of the first clock; and a ratio of a sleep timer to the calibration count of the second clock.

16. The method as claimed in claim 15, and including initiating the calibration measurements relative to the third clock signal substantially simultaneously.

17. The method as claimed in claim 14, and including initiating the calibration measurements relative to the third clock signal substantially simultaneously.

18. The method as claimed in claim 13, and including initiating the calibration measurements relative to the third clock signal substantially simultaneously.

* * * * *